(12) United States Patent
Kidess

(10) Patent No.: US 12,108,925 B2
(45) Date of Patent: Oct. 8, 2024

(54) APPARATUS FOR COMPENSATING PRESSURE SURGES

(71) Applicant: Hilti Aktiengesellschaft, Schaan (LI)

(72) Inventor: Anton Kidess, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 346 days.

(21) Appl. No.: 17/632,716

(22) PCT Filed: Jul. 24, 2020

(86) PCT No.: PCT/EP2020/070977
§ 371 (c)(1),
(2) Date: Feb. 3, 2022

(87) PCT Pub. No.: WO2021/023526
PCT Pub. Date: Feb. 11, 2021

(65) Prior Publication Data
US 2022/0280004 A1   Sep. 8, 2022

(30) Foreign Application Priority Data

Aug. 5, 2019 (EP) ..................................... 19189939

(51) Int. Cl.
*F16L 55/04* (2006.01)
*A47L 9/00* (2006.01)
*A47L 9/24* (2006.01)

(52) U.S. Cl.
CPC ............ *A47L 9/248* (2013.01); *A47L 9/0072* (2013.01); *F16L 55/04* (2013.01)

(58) Field of Classification Search
CPC .................................. F16L 55/027; F16L 55/04

USPC ................. 138/37, 39, 40, 44; 366/337, 336
See application file for complete search history.

(56) References Cited

U.S. PATENT DOCUMENTS

| | | | | |
|---|---|---|---|---|
| 1,298,471 A | * | 3/1919 | Dodge | G01F 1/42 138/44 |
| 1,559,156 A | * | 10/1925 | Bullock | G01F 1/42 138/44 |
| 1,568,639 A | * | 1/1926 | William | F16H 61/0262 475/111 |

(Continued)

FOREIGN PATENT DOCUMENTS

| CN | 101088449 A | 12/2007 |
|---|---|---|
| CN | 101138477 A | 3/2008 |

(Continued)

OTHER PUBLICATIONS

PCT/EP2020/070977, International Search Report dated Sep. 14, 2020 (Two (2) pages).

*Primary Examiner* — Patrick F Brinson
(74) *Attorney, Agent, or Firm* — Crowell & Moring LLP

(57) ABSTRACT

An apparatus for a vacuum cleaner for compensating air pressure surges, where a first air flow is flowable in a first flow direction through the apparatus and a second air flow is flowable in a second flow direction through the apparatus, includes a main body having a first cross-sectional area of flow and a flow resistance element. A free end of the flow resistance element projects from the main body and produces a second cross-sectional area of flow. The first cross-sectional area of flow is larger than the second cross-sectional area of flow such that the second air flow flowable in the second flow direction is reduced.

4 Claims, 9 Drawing Sheets

(56) References Cited

U.S. PATENT DOCUMENTS

| | | | | |
|---|---|---|---|---|
| 1,663,998 | A * | 3/1928 | Schmidt | F04D 29/428 138/44 |
| 2,511,896 | A * | 6/1950 | Bingley | H01P 3/14 138/44 |
| 3,212,521 | A * | 10/1965 | Jean | B01J 3/006 138/44 |
| 3,894,562 | A * | 7/1975 | Moseley, Jr | F15D 1/02 138/44 |
| 3,983,903 | A | 10/1976 | Kuehn, Jr. | |
| 4,118,173 | A * | 10/1978 | Shakiba | F23G 7/085 138/44 |
| 5,085,058 | A * | 2/1992 | Aaron | F25B 41/38 138/44 |
| 5,588,635 | A * | 12/1996 | Hartman | F16K 47/08 138/44 |
| 7,552,507 | B2 | 6/2009 | Burnham | |
| 9,456,720 | B2 | 10/2016 | Catalfamo | |
| 2009/0250132 | A1 * | 10/2009 | Bivin | G05D 7/0186 138/45 |
| 2013/0263406 | A1 | 10/2013 | Amisani et al. | |
| 2021/0212540 | A1 | 7/2021 | Hanslmeier et al. | |

FOREIGN PATENT DOCUMENTS

| | | |
|---|---|---|
| CN | 103124512 A | 5/2013 |
| EP | 3 498 142 A1 | 6/2019 |
| GB | 2 158 214 A | 11/1985 |
| JP | 51-89001 A | 8/1976 |
| JP | 2-43956 U | 3/1990 |
| JP | 2001-218706 A | 8/2001 |
| JP | 2006-55379 A | 3/2006 |
| JP | 2008-132277 A | 6/2008 |
| JP | 2008-154740 A | 7/2008 |
| JP | 2021-506540 A | 2/2021 |
| WO | WO 2019/120809 A1 | 6/2019 |

* cited by examiner

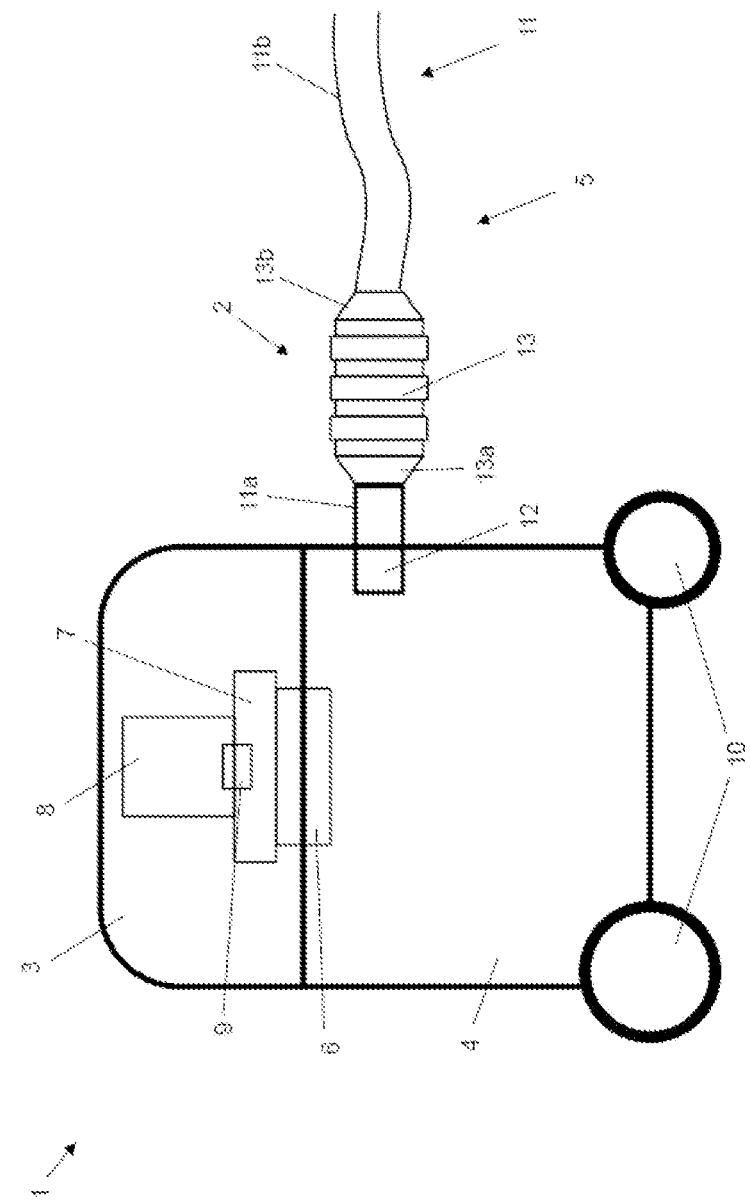

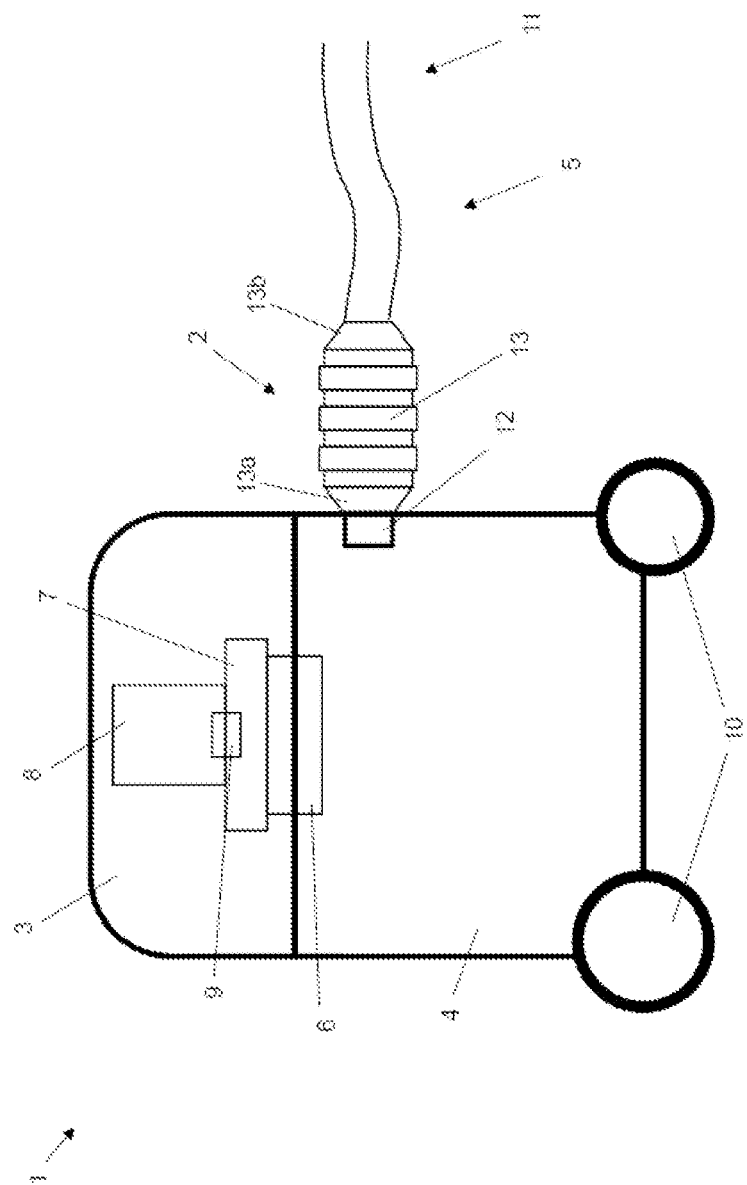

APPARATUS FOR COMPENSATING PRESSURE SURGES

BACKGROUND AND SUMMARY OF THE INVENTION

The present invention relates to an apparatus for a vacuum cleaner for compensating air pressure surges, through which apparatus a first air flow can flow in a first flow direction and a second air flow can flow in a second flow direction.

Furthermore, the present invention relates to a vacuum cleaner hose having an apparatus for a vacuum cleaner for compensating air pressure surges.

Moreover, the present invention relates to a vacuum cleaner having an apparatus for a vacuum cleaner for compensating air pressure surges.

Prior art vacuum cleaners that are used in combination with a dust-producing power tool, especially hammer drills and saws, usually have a filter clearing system. It is possible in this context for filter clearing to be accomplished by means of a brief reversal of the usual air flow through the filter to be cleaned. The air flow briefly flowing counter to the usual flow direction produces a pressure surge which makes the accumulated dust and dirt fall out of the filter into a storage container, with the result that it is then possible once again for sufficient air to flow through the filter and for the filter to have an adequate filtering function.

On the one hand, the pressure surge produced by the brief reversal of the usual air flow is perceived as unpleasant by the users of the vacuum cleaner and, on the other hand, it impairs the suction capacity of the vacuum cleaner.

It is thus the object of the present invention to provide an apparatus for a vacuum cleaner, and a vacuum cleaner hose having an apparatus for a vacuum cleaner, which solves the abovementioned problem and reduces the effect of the pressure surge.

In this case, the object is achieved by an apparatus for a vacuum cleaner for compensating air pressure surges, through which apparatus a first air flow can flow in a first flow direction and a second air flow can flow in a second flow direction.

According to the invention, the apparatus comprises a main body having a first cross-sectional area of flow and at least one flow resistance element, a free end of which projects at least in some section or sections from the main body in the second flow direction, for producing a second cross-sectional area of flow, wherein the first cross-sectional area of flow is larger than the second cross-sectional area of flow, with the result that the second air flow flowing in the second flow direction is reduced.

According to an advantageous embodiment of the present invention, it may be possible for the main body to be configured in the form of a cylinder, and for the at least one flow resistance element to be configured in the form of a funnel, with the result that, at least in some section or sections, a stagnation volume for at least some of the second air flow is formed between an outer lateral surface of the flow resistance element and an inner lateral surface of the main body. It is thereby possible to produce an enclosed surface on the flow resistance element both in a radial and in an axial direction, with the result that particularly effective compensation of air pressure surges is achieved.

The object is furthermore achieved by a vacuum cleaner hose having an apparatus for a vacuum cleaner for compensating air pressure surges, through which apparatus a first air flow can flow in a first flow direction and a second air flow can flow in a second flow direction.

The object is furthermore achieved by a vacuum cleaner having an apparatus for a vacuum cleaner for compensating air pressure surges, through which apparatus a first air flow can flow in a first flow direction and a second air flow can flow in a second flow direction.

Further advantages can be found in the following description of the figures. Various exemplary embodiments of the present invention are illustrated in the figures. The figures, the description and the claims contain numerous features in combination. A person skilled in the art will expediently also consider the features individually and combine them to form useful further combinations.

In the figures, identical and similar components are denoted by the same reference signs.

BRIEF DESCRIPTION OF THE DRAWINGS

FIG. 2 shows a schematic side view of a vacuum cleaner having a vacuum cleaner hose according to the invention having an apparatus according to the invention for compensating air pressure surges according to a second embodiment;

FIG. 3 shows a schematic side view of a vacuum cleaner having a vacuum cleaner hose according to the invention having an apparatus according to the invention for compensating air pressure surges according to a third embodiment;

DETAILED DESCRIPTION OF THE DRAWINGS

Figure 1A:
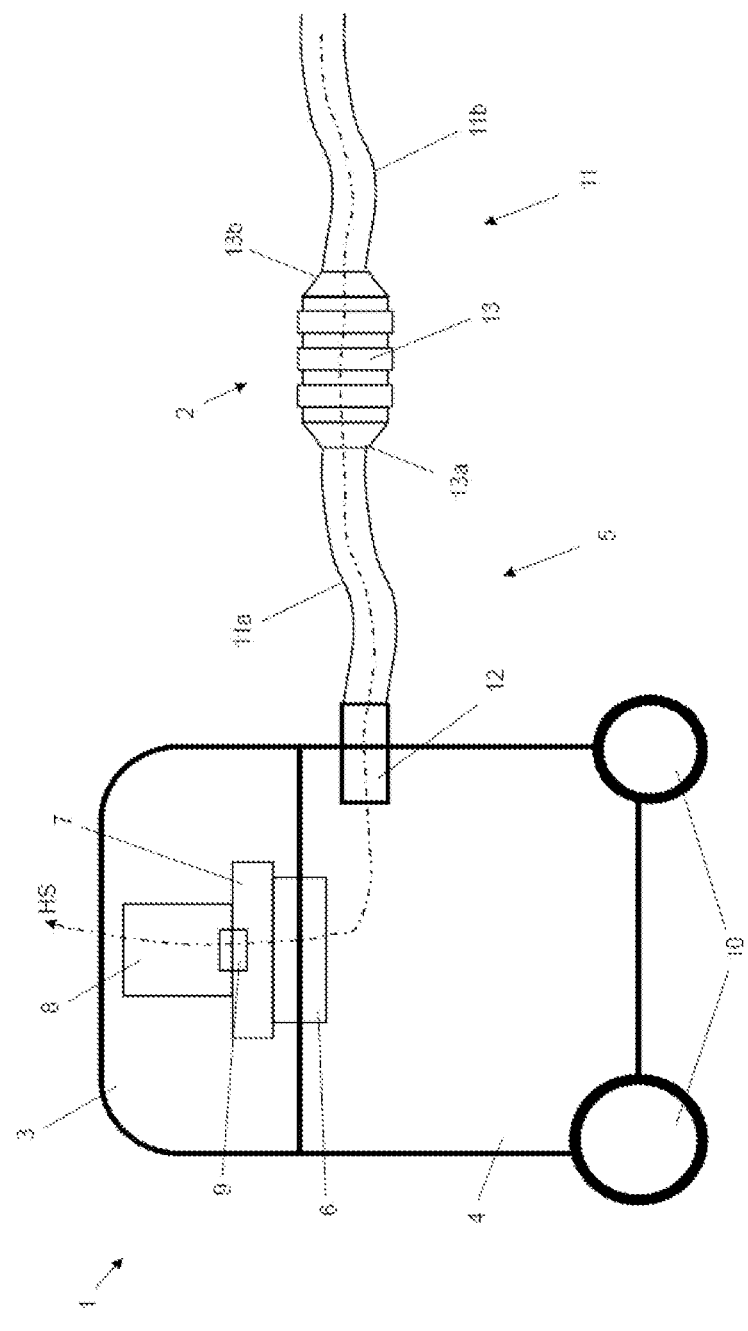
FIG. 1a shows a schematic side view of a vacuum cleaner having a vacuum cleaner hose according to the invention and having an apparatus according to the invention for compensating air pressure surges according to a first embodiment and a first air flow in a first flow direction.
Figure 1B:
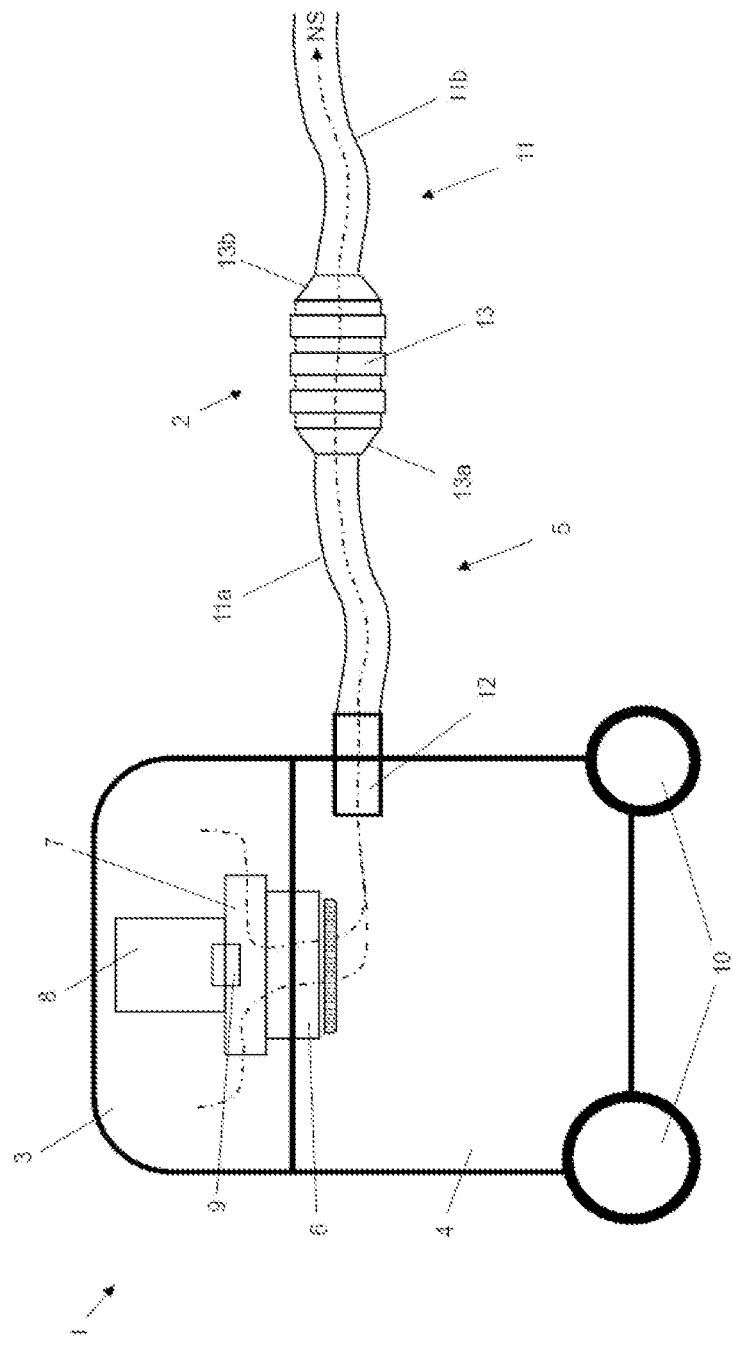
FIG. 1b shows a schematic side view of a vacuum cleaner having a vacuum cleaner hose according to the invention and having the apparatus according to the invention for compensating air pressure surges according to a first embodiment and a second air flow in a second flow direction.

FIGS. 1a and 1b show a vacuum cleaner 1 having an apparatus 2 for compensating air pressure surges according to a first embodiment.

Here, the vacuum cleaner 1 substantially comprises a suction head 3, a storage container 4 and an intake device 5.

As can be seen from FIGS. 1a to 3, the suction head 3, in turn, substantially comprises a filter 6, a filter clearing device 7 and a turbine 8.

The turbine 6 serves to produce a vacuum, by virtue of which a first air flow LS1 flows into the interior of the vacuum cleaner 1. By means of the first air flow LS1, dust particles and dirt particles can be sucked up and conveyed into the storage container 4 for storage.

The filter 6 serves to filter dust and dirt particles out of a first air flow HS drawn in by the vacuum cleaner 1, and thus, inter alia, protects the turbine 8 from dust and contamination.

The filter clearing device 7 serves to clean the filter 6 by a brief reversal of the first air flow LS1 from a first flow direction HS into a second air flow LS2 along a second flow direction NS. The sudden reversal of the air flow produces a pressure surge, which dislodges the dust and dirt accumulated on or in the filter 6 in the direction of the storage container 4. As a result, the filter 6 once more becomes free and functional. By means of the filter clearing device 7, the second air flow LS2 along the second flow direction NS is then readjusted to the first air flow LS1 along the first flow direction HS. The functioning and, in particular, the adjustment of the filter clearing device 7 to the first or second air flow LS1, LS2 is controlled by a control device 9.

The storage container 4 is configured substantially as a container with a holding volume. Four wheels 10 are provided on the underside of the storage container 4 configured as a container to ensure mobility of the vacuum cleaner 1. Only two wheels 10 are shown in the figures.

The intake device 5 substantially comprises a vacuum cleaner hose 11, a fastening element 12 and a nozzle. The nozzle may be, for example, a floor nozzle. The nozzle is not illustrated in the figures.

The fastening element 12 is configured substantially as a cylindrical tube and serves as an interface or connection for the vacuum cleaner hose 11 to the storage container 4.

Figure 5:
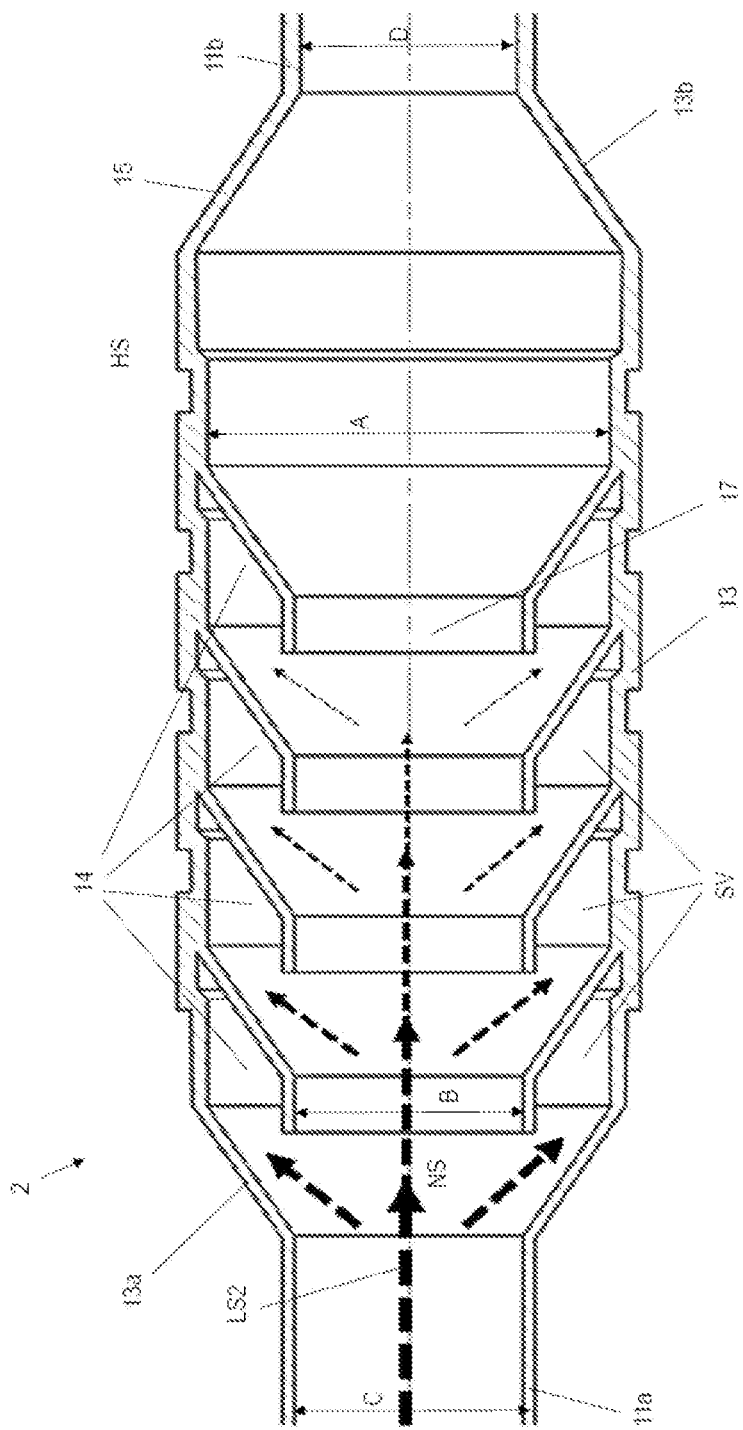
FIG. 5 shows a side view of the apparatus according to the invention for compensating air pressure surges according to the first embodiment with a second air flow in a second flow direction.
Figure 6:
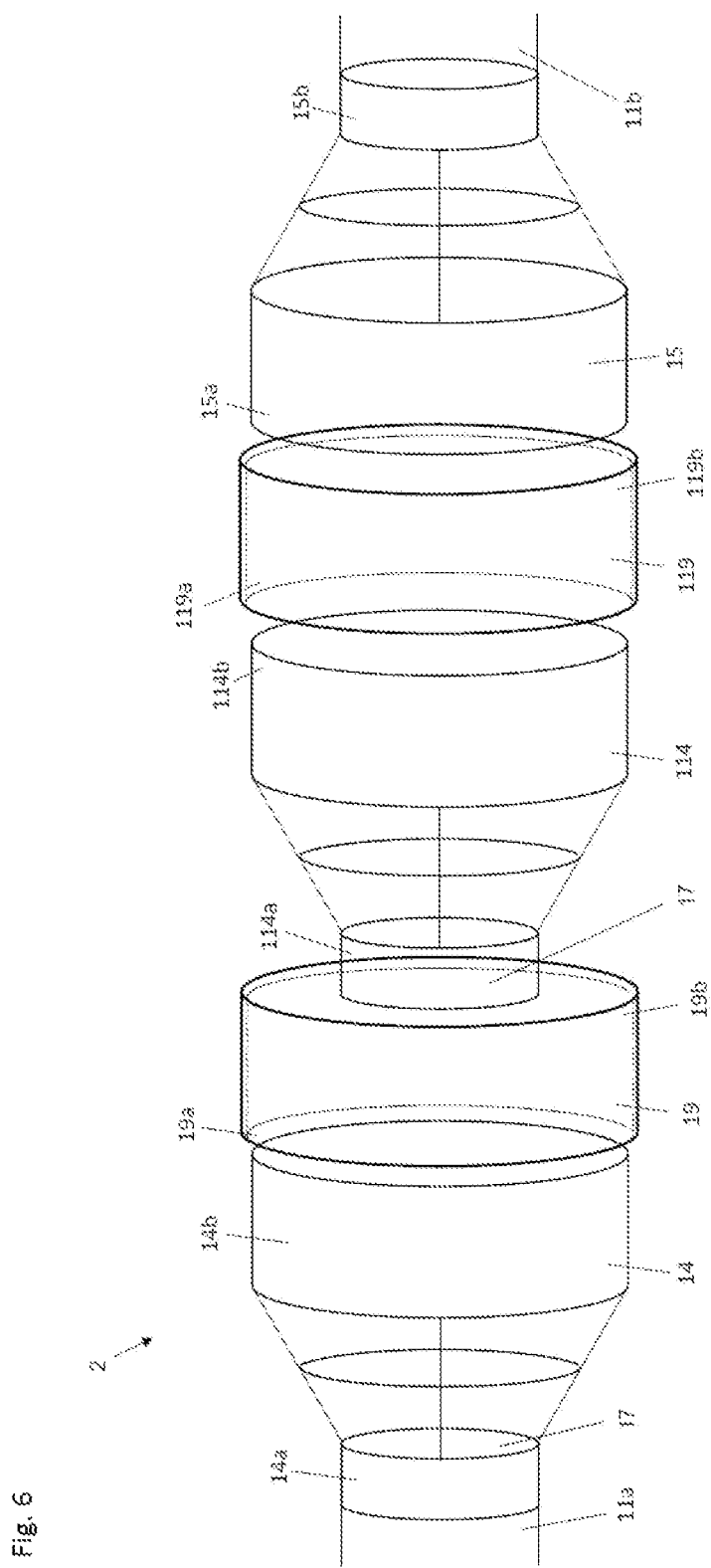
FIG. 6 shows an exploded illustration of the apparatus according to the invention for compensating air pressure surges according to a first embodiment.
Figure 7:
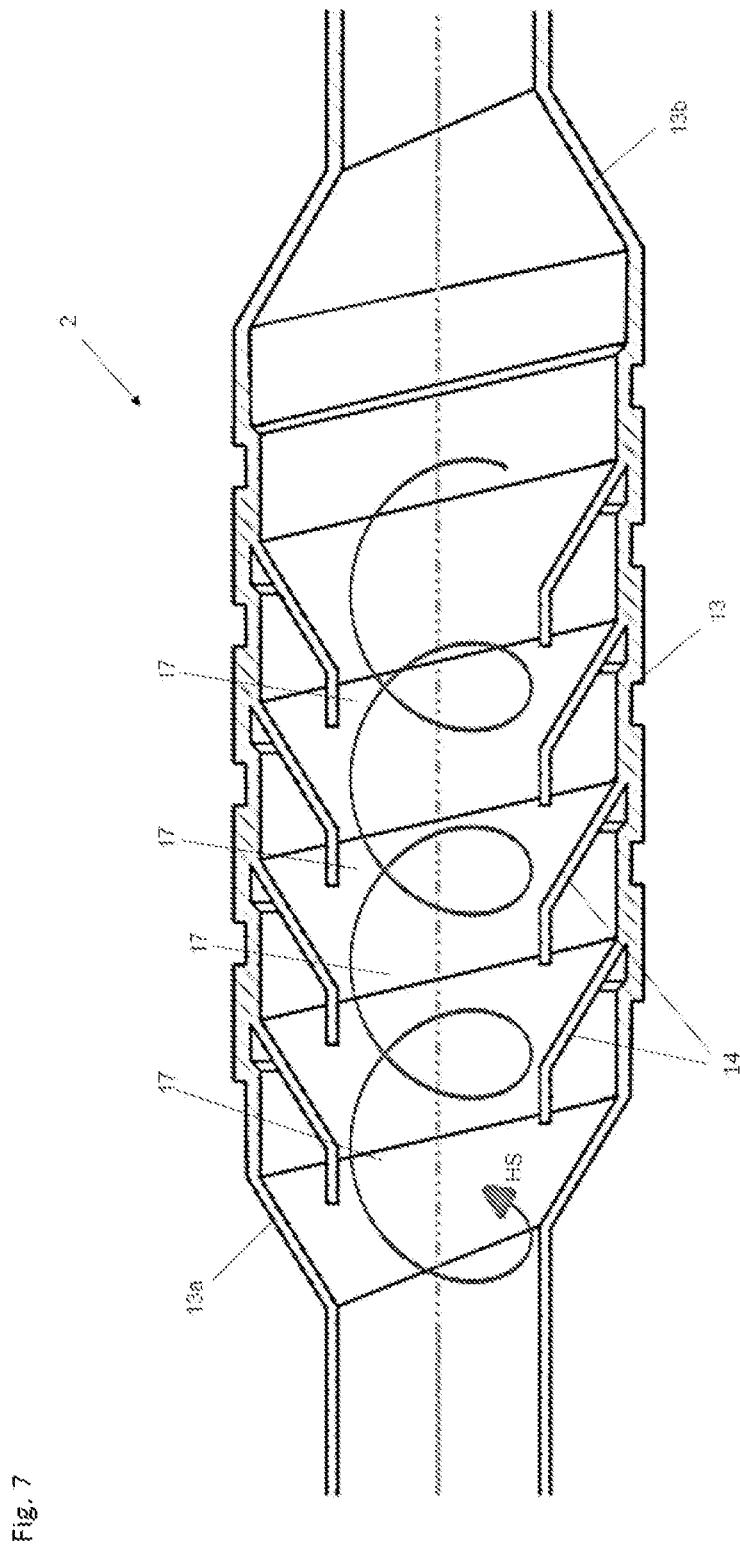
FIG. 7 shows a side view of the apparatus according to the invention for compensating air pressure surges according to a second embodiment with a first air flow in a first flow direction.

FIGS. 5 to 7 show the apparatus 2 for compensating air pressure surges according to a first embodiment. In this case, the apparatus 2 substantially comprises a main body 13 and flow resistance elements 14.

The main body 13 according to the first embodiment has a substantially cylindrical, tubular shape with a first end 13*a* and a second end 13*b*. The main body 13 has a first cross-sectional area of flow A. As can be seen, in particular, from FIGS. 4 to 6, the cylindrical, tubular main body 13 has a funnel-shaped attachment element 15 both at the first and at the second end 13*a*, 13*b*. The attachment element 15 serves for the transition or attachment of the main body 13 to the vacuum cleaner hose 11. According to the first embodiment in FIGS. 1*a* and 1*b*, the vacuum cleaner hose 11 consists of a first hose portion 11*a* with a cross-sectional area of flow C and a second hose portion 11*b* with a cross-sectional area of flow D. The first hose portion 11*a* extends from the fastening element 12 to the first end 13*a* of the main body 13. The second hose portion 11*b* extends from the second end 13*b* of the main body 13 to the nozzle (not shown).

Figure 4:
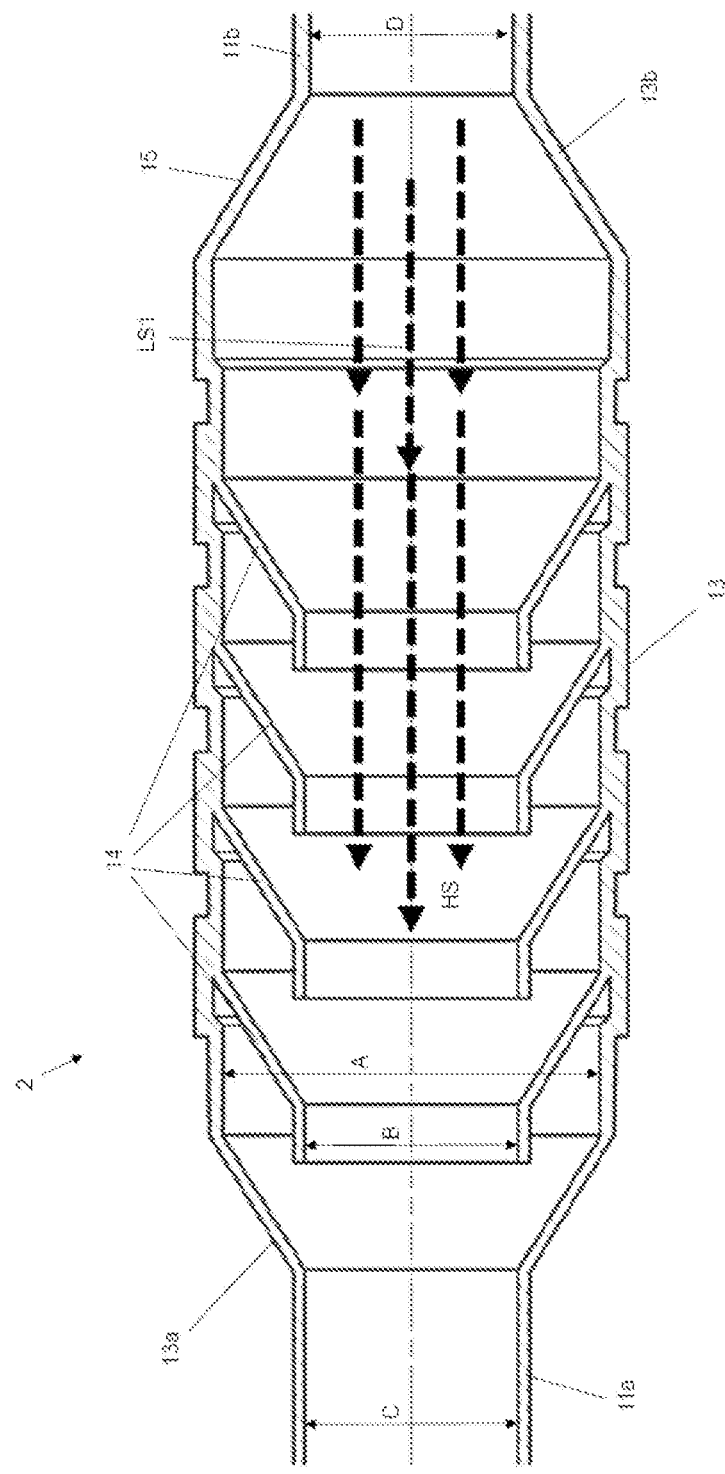
FIG. 4 shows a side view of the apparatus according to the invention for compensating air pressure surges according to a first embodiment with a first air flow in a first flow direction.

According to a first embodiment, the flow resistance element 14 is configured substantially as a funnel. The flow resistance element 14 configured as a funnel comprises a first end 14*a* and a second end 14*b*. By means of the first end 14*a*, the flow resistance element 14 configured as a funnel is positioned on an inner lateral surface 16 of the main body 13. The second end 14*b* of the flow resistance element 14 projects into the interior of the main body 13, with the result that a circular opening 17 of the flow resistance element 14 configured as a funnel forms a second cross-sectional area of flow B. As shown in FIGS. 4 to 6, the first cross-sectional area of flow A is larger than the second cross-sectional area of flow B. According to an advantageous embodiment, the first cross-sectional area of flow A is twice as large as the second cross-sectional area of flow B. However, it is also possible for the second cross-sectional area of flow B to be just a tenth of the first cross-sectional area of flow A. According to the first embodiment, the cross-sectional area of flow B at the second end 14*b* of the flow resistance element 14 corresponds substantially to the cross-sectional area of flow C of the first hose portion 11*a* and to the cross-sectional area of flow D of the second hose portion 11*b*. According to an alternative embodiment, however, the cross-sectional areas of flow B, C and D may also be of different sizes. In each case, the cross-sectional area of flow A is larger than the cross-sectional area of flow B.

The flow resistance element 14 is positioned and aligned in the interior of the main body 13 in such a way that a stagnation volume SV for at least some of the second air flow LS2 is formed between an outer lateral surface 18 of the flow resistance element 14 configured as a funnel and an inner lateral surface 16 of the main body 13. The stagnation volume may also be referred to as a stagnation space or dead space.

As illustrated in FIG. 1*a*, during the use of the vacuum cleaner 1 in the vacuum cleaning mode, a first air flow LS1 flows in a first flow direction HS from the floor nozzle (not shown) via the vacuum cleaner hose 11 through the apparatus 2 for compensating air pressure surges, the storage container 4, the filter 6, and the turbine 8, and back out of the suction head 3. In the vacuum cleaning mode, dust and dirt particles are thereby sucked up. In the vacuum cleaner mode, the first air flow LS1 flows from the second end 13*b* of the main body 13, along the main body 13, through the flow resistance elements 14 to the first end 13*a* of the main body 13 (cf. FIG. 5). In the first flow direction HS, the first air flow LS1 is not significantly impaired.

FIG. 1*b* shows the vacuum cleaner 1 in a filter clearing mode, by means of which the filter 6 is freed from the accumulated dust and dirt (as described above). By brief reversal of the first air flow LS1 along the first flow direction HS into the second air flow LS2 along the second flow direction NS, a pressure surge (also referred to as an air pressure surge) through the filter 6 is produced. This pressure surge is not limited to the filter 6 but also propagates along the second air flow direction NS into the intake device and, in particular, into the vacuum cleaner hose 11.

As shown in FIG. 5, the second air flow LS2 flows along the second flow direction NS from the first end 13*a* of the main body 13, through the main body 13 and the flow resistance elements 14, to the second end 13*b* of the main body 13. Through the funnel-shaped flow resistance elements 14, some of the second air flow LS2 flows successively into the stagnation volume SV between the main body 13 and the flow resistance element 14. The pressure surge is thereby dissipated, with the result that ultimately the pressure surge or the second air flow LS2 is completely dispersed or dissipated at the second end 13*b* of the main body 13 of the apparatus 2.

As already mentioned above, FIG. 1 shows the first embodiment of the vacuum cleaner hose 11 according to the invention, wherein the apparatus 2 for compensating air pressure surges is positioned between a first and a second hose portion 11*a*, 11*b*. The two hose portions 11*a* are of substantially the same length.

FIG. 2 shows a second embodiment of the vacuum cleaner hose 11 according to the invention, wherein the apparatus 2 for compensating air pressure surges is positioned between a first and a second hose portion 11a, 11b. In this case, the first hose portion 11a is shorter than the second hose portion 11b.

FIG. 3 shows a third embodiment of the vacuum cleaner hose 11 according to the invention, wherein the apparatus 2 for compensating air pressure surges is positioned directly on the fastening element 12 for the storage container 4. There is thus just one hose portion or a continuous vacuum cleaner hose 11.

According to another embodiment of the apparatus 2 for compensating air pressure surges, the apparatus 2 is of modular construction or has a modular construction (cf. exploded illustration in FIG. 6). For this purpose, the apparatus 2 comprises a first and a second flow resistance element 14, 114, a first and a second connecting element 19, 119 and an attachment element 15. The attachment element 15 corresponds substantially to the shape and configuration of the first or second flow resistance element 14, 114.

To form the apparatus 2, the first end 14a of the first flow resistance element 14 is positioned on the first hose portion 11a. The second end 14b of the first flow resistance element 14 is, in turn, mounted on the first end 19a of the first connecting element 19. The first end 114a of the second flow resistance element 114 is positioned in the interior of the first flow resistance element 14. The second end 19b of the first connecting element 19 is secured to the second end 114b of the second flow resistance element 114. The first end 119a of the second connecting element 119 is likewise positioned at the second end 114b of the second flow resistance element 114. Finally, the second end 119b of the second connecting element 119 is secured to the first end 15a of the attachment element 15. The second end 15b of the attachment element 15 is secured to the second hose portion 11b of the vacuum cleaner hose 11. In this case, the fastenings are configured in such a way that they can be released again, thus enabling the individual components of the apparatus 2 to be released from one another again. As a result, the apparatus 2 can be of modular configuration, and the number of flow resistance elements 14, 114 for the apparatus 2 is a matter of free choice.

The first end 14a of the first flow resistance element 14 and the first end 114a of the second flow resistance element 114 may also be referred to as the free end.

Figure 8:
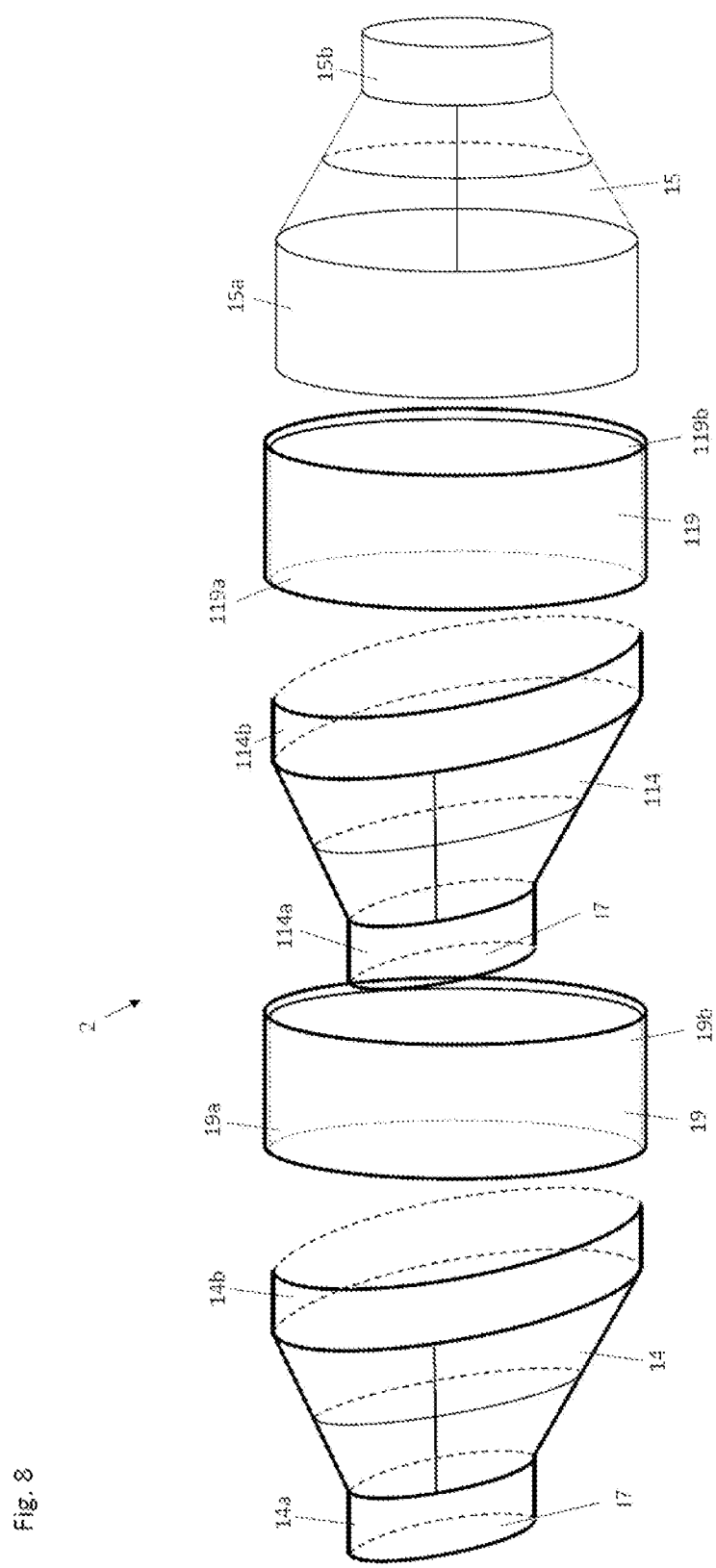
FIG. 8 shows an exploded illustration of the apparatus according to the invention for compensating air pressure surges according to the second embodiment.

FIGS. 7 and 8 show another embodiment of the apparatus 2 for compensating air pressure surges, in which the funnel-shaped flow resistance elements 14 are of asymmetrical configuration. The funnels of the flow resistance elements 14 thus have a spiral geometry. As indicated in the figures, the opening 17 in the flow resistance element 14 is not circular (as in the first embodiment) but is in the form of an ellipse. By means of this special embodiment, a spiral rotary motion is imparted to the first air flow LS1 along the first flow direction HS and in the interior of the main body 13.

FIG. 8 shows another embodiment, in which, on the one hand, the individual components of the apparatus 2 for compensating air pressure surges are of modular configuration and, on the other hand, the openings in the flow resistance element 14, 114 are not of circular configuration (as in the first embodiment) but in the form of an ellipse.

LIST OF REFERENCE CHARACTERS

1 Vacuum cleaner
2 Apparatus for a vacuum cleaner for compensating air pressure surges
3 Suction head
4 Storage container
5 Intake device
6 Filter
7 Filter clearing device
8 Turbine
9 Control device
10 Wheels
11 Vacuum cleaner hose
11a First hose portion
11b Second hose portion
12 Fastening element
13 Main body
13a First end of the main body
13b Second end of the main body
First flow resistance element
14a First end of the first flow resistance element
14b Second end of the first flow resistance element
114 Second flow resistance element
114a First end of the second flow resistance element
114b Second end of the second flow resistance element
15 Attachment element
15a First end of the attachment element
15b Second end of the attachment element
16 Inner lateral surface of the main body
17 Opening in the flow resistance element
18 Lateral surface of the flow resistance element
19 First connecting element
19a First end of the first connecting element
19b Second end of the first connecting element
119 Second connecting element
119a First end of the second connecting element
119b Second end of the second connecting element
LS1 First air flow
LS2 Second air flow
HS First flow direction
NS Second flow direction
SV Stagnation volume
A First cross-sectional area of flow
B Second cross-sectional area of flow
C Cross-sectional area of flow of the first hose portion
D Cross-sectional area of flow of the second hose portion

The invention claimed is:

1. An apparatus for a vacuum cleaner for compensating air pressure surges, comprising:
a main body having a first cross-sectional area of flow, wherein in a vacuum cleaning mode a first air flow is flowable in a first flow direction through the first cross-sectional area and through an entirety of the apparatus; and
a flow resistance element, wherein a free end of the flow resistance element projects from the main body and has a second cross-sectional area of flow, wherein the first cross-sectional area of flow is larger than the second cross-sectional area of flow, and wherein in a filter cleaning mode a second air flow is flowable in the second flow direction through the second cross-sectional area and through the entirety of the apparatus.

2. The apparatus as claimed in claim 1, wherein the main body is configured in a form of a cylinder and wherein the flow resistance element is configured in a form of a funnel such that a stagnation volume for at least some of the second air flow is formed between an outer lateral surface of the flow resistance element and an inner lateral surface of the main body.

3. A device, comprising:
an apparatus for a vacuum cleaner for compensating air pressure surges, wherein a first air flow is flowable in a first flow direction through the apparatus and a second air flow is flowable in a second flow direction through the apparatus, wherein the apparatus includes:
   a main body having a first cross-sectional area of flow; and
   a flow resistance element, wherein a free end of the flow resistance element projects from the main body and produces a second cross-sectional area of flow and wherein the first cross-sectional area of flow is larger than the second cross-sectional area of flow such that the second air flow flowable in the second flow direction is reduced; and
a vacuum cleaner hose couplable to the apparatus.

4. A device, comprising:
an apparatus for a vacuum cleaner for compensating air pressure surges, wherein a first air flow is flowable in a first flow direction through the apparatus and a second air flow is flowable in a second flow direction through the apparatus, wherein the apparatus includes:
   a main body having a first cross-sectional area of flow; and
   a flow resistance element, wherein a free end of the flow resistance element projects from the main body and produces a second cross-sectional area of flow and wherein the first cross-sectional area of flow is larger than the second cross-sectional area of flow such that the second air flow flowable in the second flow direction is reduced; and
a vacuum cleaner couplable to the apparatus.

\* \* \* \* \*